Dec. 23, 1947. W. H. CHAMBERLAIN 2,433,318
COUNTER MOLDING MACHINE
Filed Sept. 5, 1945
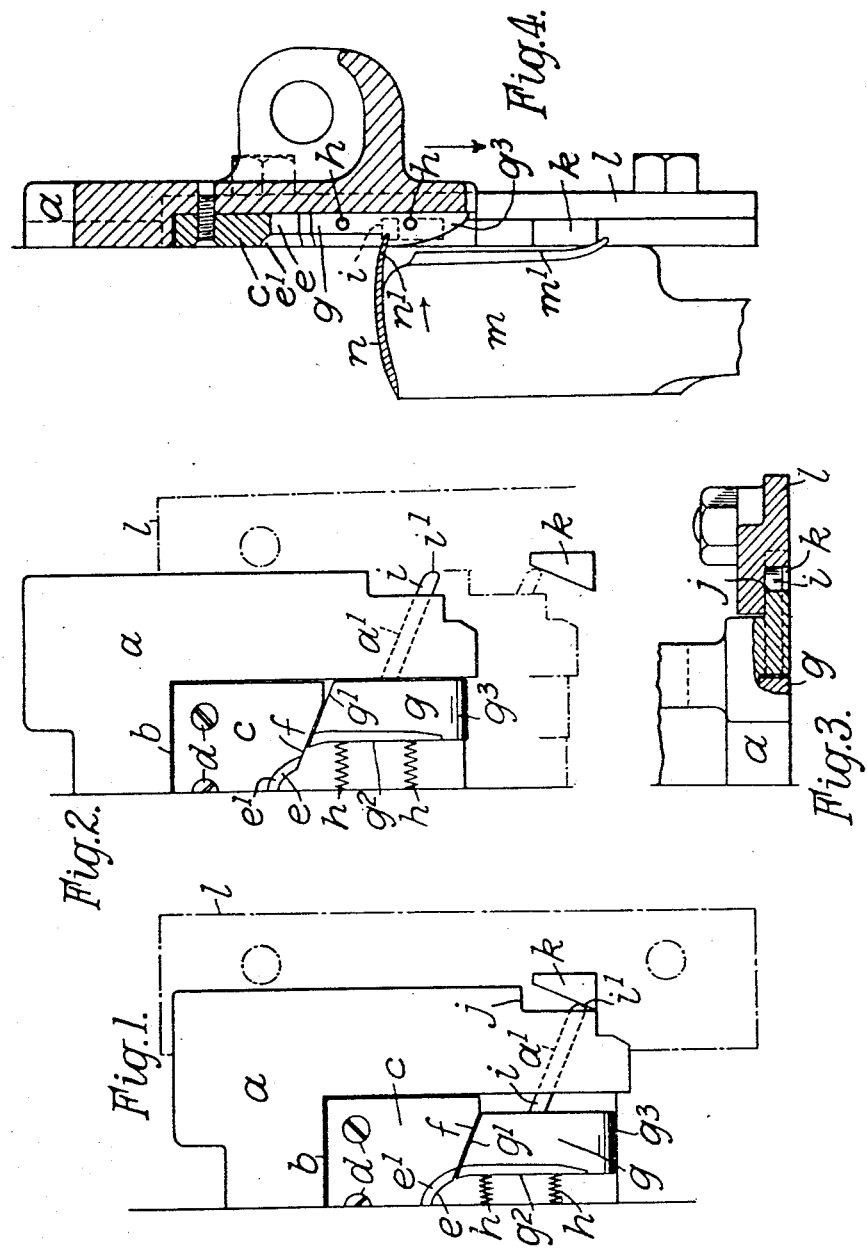
Inventor
WILLIAM HEDGER CHAMBERLAIN
BY
HIS AGENT.

Patented Dec. 23, 1947

2,433,318

UNITED STATES PATENT OFFICE 2,433,318

COUNTER MOLDING MACHINE

William Hedger Chamberlain, Higham Ferrers, England, assignor to W. W. Chamberlain & Sons, Limited, Higham Ferrers, England, a British joint-stock company Application September 5, 1945, Serial No. 614,537 In Great Britain August 3, 1944

Section 1, Public Law 690, August 8, 1946 Patent expires August 3, 1964

6 Claims. (Cl. 12—66)

This invention relates to machines for molding shoe heel counters, and more particularly to counter molding machines of the Stewart type such as described in my prior Patents No. 2,153,235, dated April 4, 1939, and No. 2,326,437, dated August 10, 1943.

The invention has for its main object to provide improved means for shaping the projecting edge of the counter blank by the descent of the sliding door or wiper while the body of the blank is gripped in the gap between the main parts of the mold, namely a pair of jaws rocking inwardly together on either side of a center-piece to which vertical pressure is applied by a plunger operated by an eccentric rod from the bottom shaft of the machine, as well known in the art.

The invention has for another object to provide shaping means for the purpose mentioned, comprising a member fixed to the wiper and adapted to fit over the projecting top edge of the counter blank, in combination with a pair of side pressers slidably mounted near the bottom of the wiper, and positive means for forcing said pressers against the projecting side edges or wings of the blank near the end of the downward movement of the wiper.

A further object of the invention is to provide shaping means including side pressers which are spring-loaded to cause their separation for clearing the projecting side edges of the counter blank during the early stages of the descent of the wiper, the closing movement of the pressers being produced by wedge or cam surfaces fixed to the wiper guides, the pressers being fitted with tappets extending laterally of the wiper so that their outer ends engage the wedge or cam surfaces to produce a positive inward movement as the wiper approaches the end of its descent.

Other objects and advantages of the invention will hereinafter appear from the following description and the accompanying drawings of a preferred embodiment, as applied to a counter-molding machine such as described in my aforesaid patents, to which reference may be had for a fuller explanation of the molding operation. In these drawings, Fig. 1 is a half rear elevation of the sliding door or wiper of the molding machine, the wiper being in its lowest position.

Fig. 2 is a similar view with the wiper on its downward stroke.

Fig. 3 is a plan of Fig. 2, showing parts in section.

Fig. 4 is a side view of Fig. 2 in section on the center-line of the wiper, showing also the center piece upon which the counter blank is to be molded.

As shown in these drawings, the wiper $a$ has its rear face provided with a rectangular cavity or recess $b$, in which the shaping means are mounted, the top plate or saddle block $c$ being fixed at the top of the cavity, for example by screws $d$ with countersunk heads; the lower edge of this top plate has a central arched portion $e$ and two inclined portions $f$ extending almost to the sides of the cavity, the angle of these inclined portions being for example 22½ degrees to the horizontal. The central arched portion $e$ is bevelled at $e^1$ towards the rear face of the wiper, so as to produce an upturned or inclined lip around the top of the blank during the molding operation. Below the top plate $c$ are two slidable presser blocks or side plates $g$, having their upper edges $g^1$ inclined at the same angle as the inclined portions $f$ of the top plate with which they are in sliding contact; these side plates have their inner edges $g^2$ slightly curved to a concave shape in continuation of the arched portion $e$ of the top plate and also bevelled towards the rear face to give the desired shape to the sides or wings of the counter blank. These side plates are controlled by springs $h$ which urge them apart to the limit of the width of the cavity, in which position (Fig. 2) their upper extremities stand clear of the arched portion $e$ of the top plate by a distance of about three-eighths of an inch, for example.

At about the middle of their height, the side plates $g$ are fitted with rigid tappet rods $i$ of rectangular cross-section extending through guide holes $a^1$ in the wiper at the sides of the cavity and projecting at the lateral edges of the wiper, preferably inside notches or recesses $j$ on these edges so as to remain within the overall width of the wiper; the tappet rods $i$ are inclined at the same angle as the inclined portions $f$ of the top plate and their outer ends $i^1$ are adapted to engage with fixed cams or wedges $k$ upon the wiper guides $l$, the operative faces of these wedges being inclined for example at 67½ degrees to the horizontal so that the tappets $i$ are perpendicular to the wedge faces. During the descent of the wiper, and within the last part of its movement, as shown in chain lines in Fig. 2, the tappet ends $i^1$ engage the fixed wedges $k$; the tappets are therefore driven inwards, as seen in Fig. 1, so as to force the side plates $g$ together for shaping the sides or wings of the counter blank. On the return movement, the springs $h$ separate the side plates $g$ and release the shaped blank for ejection or removal as soon as the wiper *a* is raised clear of the center-piece.

Fig. 4 shows the center-piece *m* rocked forward to support the counter blank (indicated in section at *n*) around its upper end for molding by the main jaws in the usual manner, the projecting edge $n^1$ of the blank being still free of the descending wiper; as seen in this figure, the center-piece has a curved front $m^1$, designed for the molding of counters for drop-waist shoes, and the side plates *g* have their lower ends cut away as indicated at $g^3$ to match the curvature of the front $m^1$, being thus adapted to form drop-waist or curved fronted dies for molding the projecting edge of the counter blank to a corresponding shape towards the ends of the side wing portions.

What I claim is:

1. In a counter molding machine of the character described, including a wiper adapted to rise and fall over the face of the mold, the rear face of said wiper engaging the projecting portion of a blank gripped in said mold, means for shaping said projecting portion comprising a member fixed to said wiper and adapted to fit over the projecting top edge of said blank, said fixed member being bevelled towards the rear face of said wiper to produce an inclined lip about the top of said blank, in combination with a pair of side pressers slidably mounted near the bottom of said wiper, said side pressers being bevelled towards the rear face of said wiper, and positive means for forcing said pressers against the projecting side edges of said blank near the end of the fall of said wiper.

2. In a counter molding machine of the character described, including a wiper adapted to rise and fall over the face of the mold in relation to a blank gripped in said mold, means for shaping a projecting portion of said blank comprising a member fixed to said wiper and adapted to fit over the projecting top edge of said blank, in combination with a pair of side pressers slidably mounted near the bottom of said wiper, tappets fitted to said pressers and extending laterally of said wiper, and fixed wedges located in the paths of said tappets, said tappets engaging with said wedges to produce inward movement of said pressers as said wiper approaches the end of its fall.

3. In a counter molding machine of the character described, including a wiper adapted to rise and fall over the face of the mold in relation to a blank gripped in said mold, means for shaping a projecting portion of said blank comprising a saddle block fixed to said wiper and adapted to fit over the projecting top edge of said blank, a pair of side pressers slidably mounted near the bottom of said wiper, spring means for separating said pressers to clear the projecting side edges of said blank during the early stages of the fall of said wiper, tappets fitted to said pressers and extending laterally of said wiper, and fixed wedges located in the paths of said tappets, said tappets engaging with said wedges to produce inward movement of said wiper approaches the end of its fall.

4. In a counter molding machine of the character described, including a wiper adapted to rise and fall over the face of the mold in relation to a blank gripped in said mold, means for shaping a projecting portion of said blank comprising a saddle block fixed to said wiper and adapted to fit over the projecting top edge of said blank, a pair of side pressers slidably mounted near the bottom of said wiper, tappets fitted to said pressers and extending laterally of said wiper, said pressers and tappets being slidable in directions inclined to the horizontal, and fixed wedges located in the paths of said tappets, the inward faces of said wedges being inclined to the vertical, and said tappets engaging with the inclined faces of said wedges to produce inward movement of said pressers as said wiper approaches the end of its fall.

5. In a counter-molding machine of the character described, a wiper adapted to rise and fall over the face of the mold in relation to a blank gripped in said mold, said wiper having a substantially rectangular cavity in its rear face, means located in said cavity for shaping a projecting portion of said blank, said shaping means comprising a block fixed towards the top of said cavity and adapted to fit over the projecting top edge of said blank, a pair of side pressers slidably mounted towards the bottom of said cavity, spring means for separating said pressers to clear the projecting side edges of said blank during the early stages of the fall of said wiper, and tappets secured to said pressers and extending through side walls of said cavity, and fixed wedges located in the paths of the outer ends of said tappets, said tappets engaging with said wedges to produce inward movement of said pressers as said wiper approaches the end of its fall.

6. In a counter-molding machine of the character described, a wiper adapted to rise and fall over the face of the mold in relation to a blank gripped in said mold, said wiper having a substantially rectangular cavity in its rear face, means located in said cavity for shaping a projecting portion of said blank, said shaping means comprising a block fixed towards the top of said cavity and adapted to fit over the projecting top edge of said blank, said block having a lower edge including a central arched portion and two inclined portions extending towards the sides of said cavity, a pair of side pressers slidably mounted towards the bottom of said cavity, said pressers having upper edges inclined at the same angles as and slidable in contact with said inclined portions of said fixed block, and tappets secured to said pressers, said tappets being inclined at the same angles as said inclined portions and extending through side walls of said cavity, and fixed members located in the paths of the outer ends of said tappets, said fixed members having surfaces approximately perpendicular to said tappets, and said tappets engaging said surfaces as said wiper approaches the end of its fall so as to produce inward movements of said pressers in sliding contact with said inclined portions.

WILLIAM HEDGER CHAMBERLAIN.

REFERENCES CITED

The following references are of record in the file of this patent:

UNITED STATES PATENTS

| Number | Name | Date |
| --- | --- | --- |
| 1,814,611 | Stewart | July 14, 1931 |
| 2,194,892 | Dodge | Mar. 26, 1940 |
| 435,481 | Cote | Sept. 2, 1890 |
| 365,608 | Knox | June 28, 1887 |
| 1,750,438 | Stewart | Mar. 11, 1930 |

FOREIGN PATENTS

| Number | Country | Date |
| --- | --- | --- |
| 268,032 | Great Britain | Mar. 24, 1927 |
| 488,453 | Great Britain | July 7, 1938 |